UNITED STATES PATENT OFFICE.

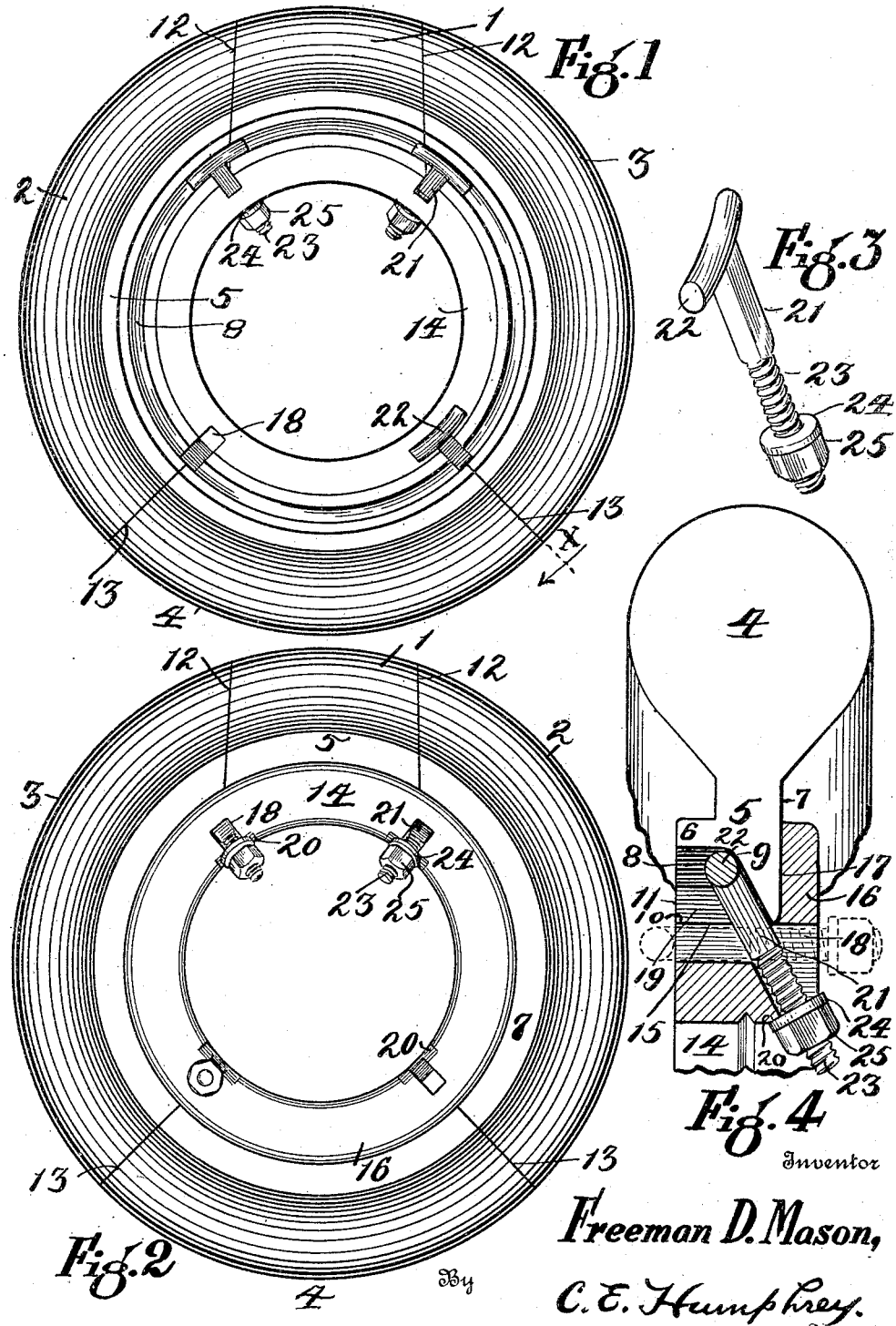

FREEMAN D. MASON, OF AKRON, OHIO.

COLLAPSIBLE CORE.

1,197,521.    Specification of Letters Patent.    Patented Sept. 5, 1916.

Application filed February 14, 1916. Serial No. 78,167.

*To all whom it may concern:*

Be it known that I, FREEMAN D. MASON, a citizen of the United States, residing at Akron, in the county of Summit and State of Ohio, have invented new and useful Improvements in Collapsible Cores, of which the following is a specification.

This invention relates to improvements in collapsible cores for the manufacture of tire shoes or casings of double-tube pneumatic tires, and the primary object of the invention resides in means employed for holding and locking the several sections of which the core is composed in assembled annular relation, said means being effectual for the purpose, easily operated to insure perfect alinement of the core when assembled and providing means for the ready collapsing of the core for its removal from the interior of the finished tire shoe.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the matter hereinafter claimed.

In the drawings in which similar reference numerals indicate like parts in the different figures, Figure 1, is a plan view of a core assembled embodying this invention; Fig. 2, is a plan view of the core shown in Fig. 1, inverted; Fig. 3, is a perspective view of a locking element employed; and Fig. 4, is a section taken approximately on line X of Fig. 1.

A ring core embodying this invention customarily consists of a plurality of segment-shaped sections which, when united together, as herein described, constitute an annular member, the outer and lateral faces of which are shaped to impart a preferred configuration to the corresponding inner face of the tire or tire shoe which is to be manufactured thereon. The sections which are employed to form the annular core are designated in the drawing by the reference numerals 1, 2, 3 and 4, and are provided with inwardly-extending flanges 5. These flanges are all similar and may be, if desired, provided on one of their lateral faces with projecting ribs or beads 6 and the opposite faces 7 of the flanges are preferably radial to the axis of the assembled core. The ribs or beads 6 are provided intermediate their inner and outer faces with grooves 8 which, in the assembled condition of the core, provide an annular grove or channel. The bottom or lateral walls 9 of the grooves 8 are preferably semi-circular in cross section. The grooves 8 are preferably separated from the inner face 10 of the flanges 5 by portions 11 of the beads or ribs 6, these latter portions 11 constituting an abutment for a purpose to be described. The lateral faces 7 and the inner faces 10 of the flanges 5 are preferably at right angles to each other. The joints 12 between the ends of the section 1 and the ends of the sections 2 and 3 are so inclined that the member 1 is substantially wedge-shaped to constitute a key-forming member. The joints 13 between the sections 2, 3 and 4 are approximately radial with respect to the axis of the assembled core.

In order to hold the various sections 1, 2, 3 and 4 in assembled annular relation I employ a locking ring 14 the outer face 15 of which is adapted to engage the inner faces 10 of the flanges 5 of the various sections, and extending from one side of the outer peripheral portion of the member 14 is a flange 16 one face 17 of which is at right angles with respect to the peripheral face 15, and adapted to co-act with the faces 7 of the flanges of the core sections, the faces 15 and 17 forming an L-shaped peripheral channel in the outer face of the member 14 which is adapted to receive the inwardly-extending flanges 5 of the core sections for holding them from inward radial movement as well as lateral displacement.

At points approximately opposite to the inner terminii of the joints 12 and 13 between the core sections, the member 14 is provided with slotted openings 18, and in alinement with these slotted openings 18 there is provided in the portions 11 registering openings 19. The inner face of the member 14 is provided adjacent to the slotted openings 18 with obliquely-inclined faces 20 constituting seats.

The various core sections are drawn inwardly toward the axial center of the assembled core so that the inner faces 10 of the flanges 5 will snugly engage the outer peripheral face 15 of the member 14 and at the same time are drawn laterally so that the lateral faces 7 of the flanges 5 of the core sections will be drawn into snug engagement with the lateral face 17 of the flange 16 on the member 14, by means of clamping members each comprising a shank 21 provided with a T-head 22, the cross sectional contour of which is adapted to permit the portion 22 to easily seat in the bottom portion of the grooves 8 in the flanges 5. The shanks 21 are preferably provided with threads 23 and on which are mounted washers 24 and clamping nuts 25.

The core is assembled by first shifting all of the T-headed clamping members into such position that the shank portions 21 thereof are parallel with the axial line of the assembled core as shown in dotted lines in Fig. 4, which is permitted by the slotted opening 18. The various core sections are then assembled about the member 14 by seating the flanges 5 in the L-shaped seat formed by the faces 15 and 17. The clamping nuts 25 are backed off sufficiently to permit the T-heads 22 to be seated in the bottom of the grooves or channels 8, which shifts the inner threaded ends of the member 21 so they extend through the inclined seats 20, after which the clamping nuts 25 are drawn up, forcing the washers 24 against the seats 20 and drawing the T-heads 22 against the inner and side walls of the grooves or channels 8 thereby drawing the core sections inwardly and obliquely so as to cause snug engagement not only between the inner faces 10 of the flanges 5 and the outer peripheral face 15 of the member 14, but also the lateral faces 7 of the flanges 5 with the lateral face 17 of the flange 16. It will be noted that when the parts are assembled, the T-head locking-members are oblique to a radial line of the core.

In collapsing the core, the nuts 25 are released sufficiently to permit the T-headed clamping members to be swung into the position shown in dotted lines in Fig. 4 and the locking-member 14 can be then removed, after which the core sections are shifted from the interior of the shoe in their numerical order.

I claim:—

1. A core of the character described comprising a plurality of separate sections having inwardly extending flanges the inner faces of which are cylindrical throughout and having one face of each flange radial to said cylindrical portion, the opposite faces of said flanges provided with arcuate recesses, which, in the assembled condition of the sections, provide an annular channel, said flanges further provided with a plurality of recesses extending from said channel inwardly to the inner cylindrical faces thereof, a ring-shaped locking member having a cylindrical outer face adapted to fit the inner cylindrical faces of said flanges and a radial flange extending radially outwardly from said cylindrical face and at a right-angle therewith and adapted to abut against one of the side faces of each of said flanges said locking member provided with a plurality of apertures extending therethrough and arranged in radial coincidence with the last named recesses in said section flanges, and a plurality of clamping members obliquely engaging in said channel and extending through said registering recesses to the inner face of said locking member for simultaneously drawing said sections inwardly and laterally against said member to hold said sections in assembled relation, the registering recesses in said flanges and locking member being of sufficient size to permit the clamping members to be swung into a position parallel with the axis of the core and transverse to the flanges of the sections for permitting the lateral removal of the locking member from connection with said core sections.

2. A core of the character described comprising a plurality of separate sections having inwardly-extending flanges provided with lateral circumferential grooves, which, in the assembled condition of the sections, provide an annular channel, a ring-shaped locking member positioned with the peripheral face thereof engaging the inner faces of said flanges, and a plurality of T-shaped clamping members positioned with the heads of said members in said channel and with the shank portions thereof extending through said locking member for holding said sections in assembled relation.

3. A core of the character described comprising a plurality of separate sections having inwardly-extending flanges provided with lateral circumferential grooves, which in the assembled condition of the sections, provide an annular channel, a ring-shaped locking member positioned with the peripheral face thereof engaging the inner faces of said flanges, and a plurality of T-shaped clamping members positioned with the heads thereof in said channel and with the shanks extending obliquely through said locking member, and nuts applied to said shanks for drawing said core sections inwardly against said locking member for holding them in assembled relation.

4. A core of the character described comprising a plurality of separate sections having inwardly-extending flanges provided with lateral circumferential grooves, which, in the assembled condition of the sections, provide an annular channel, a ringshaped locking member positioned with the peripheral face thereof engaging the inner faces of said flanges, said locking member provided with a plurality of radial slotted openings arranged in approximately radial registration with the joints between the core sections, and a plurality of T-shaped clamping members positioned with the heads thereof seated in said channel and overlapping contiguous portions of coadjacent sections and with the shanks extending through said locking member, and means on said shanks for drawing the heads inwardly for holding said core sections in assembled relation.

5. A core of the character described comprising a plurality of separate sections having inwardly-extending flanges provided with lateral circumferential grooves, which, in the assembled condition of the sections, provide an annular channel, a ring-shaped locking member positioned with the peripheral face thereof engaging the inner faces of said flanges, said locking member provided with a plurality of radially-slotted openings arranged in approximately radial registration with the joints between the core sections, and a plurality of clamping members embodying arcuate heads seated in said channel and overlapping adjacent portions of contiguous sections and with the shanks extending through said openings, and means on the threaded shanks of drawing said heads inwardly for holding said sections in assembled relation.

In testimony whereof I have hereunto set my hand.

FREEMAN D. MASON.

Copies of this patent may be obtained for five cents each, by addressing the "Commissioner of Patents, Washington, D. C."